Dec. 29, 1931.　　C. H. GAMBLE　　1,838,755
MANURE SPREADER
Filed June 13, 1928　　2 Sheets-Sheet 1

Inventor
Carl H. Gamble
Brown, Jackson,
Boettcher & Diemer
by Attorneys

Dec. 29, 1931.   C. H. GAMBLE   1,838,755
MANURE SPREADER
Filed June 13, 1928   2 Sheets-Sheet 2

Inventor
Carl H. Gamble
Brown, Jackson,
Boettcher & Dienner
By Attorneys

Patented Dec. 29, 1931

1,838,755

UNITED STATES PATENT OFFICE

CARL H. GAMBLE, OF MOLINE, ILLINOIS, ASSIGNOR TO DEERE & COMPANY, OF MOLINE, ILLINOIS, A CORPORATION OF ILLINOIS

MANURE SPREADER

Application filed June 13, 1928. Serial No. 284,893.

The present invention relates to manure spreaders and has as its general object to prevent accumulations of manure on the side supporting structure at the ends of the wide spreading device.

This wide spreading device, which is employed on most manure spreaders, usually consists of two helical blade-like members which are coaxially mounted on a transverse shaft disposed in proximity to the beaters at the rear end of the vehicle. These helical blades have opposite directions of pitch and rotate at a relatively high speed so that as the manure is thrown rearwardly from the beaters upon said widespreading device, it is projected therefrom rearwardly and laterally to obtain a fan-shaped distribution of the manure from the rear end of the vehicle.

The widespread device is mounted between rearwardly extending side portions of the vehicle structure, which side portions extend somewhat into the planes of the lateral dispersion of the manure. When the manure being spread is comparatively wet a considerable part of the laterally projected mass impinging against the side supporting means will tend to adhere thereto, where it will dry into an encrusted mass. Continuous accumulations will soon result in this mass projecting inwardly from the side supporting structure to a sufficient distance to interfere with the free rotation of the helical spreading blades. Obviously, this is an objectionable condition, and it is the fundamental object of the invention to provide improved means which will prevent these accumulations of manure on the side supporting structure. The manner in which this is accomplished will be best understood by reference to the accompanying drawings wherein Fig. 1 is a side elevational view of the rear portion of the manure spreader embodying my invention;

Figure 1:
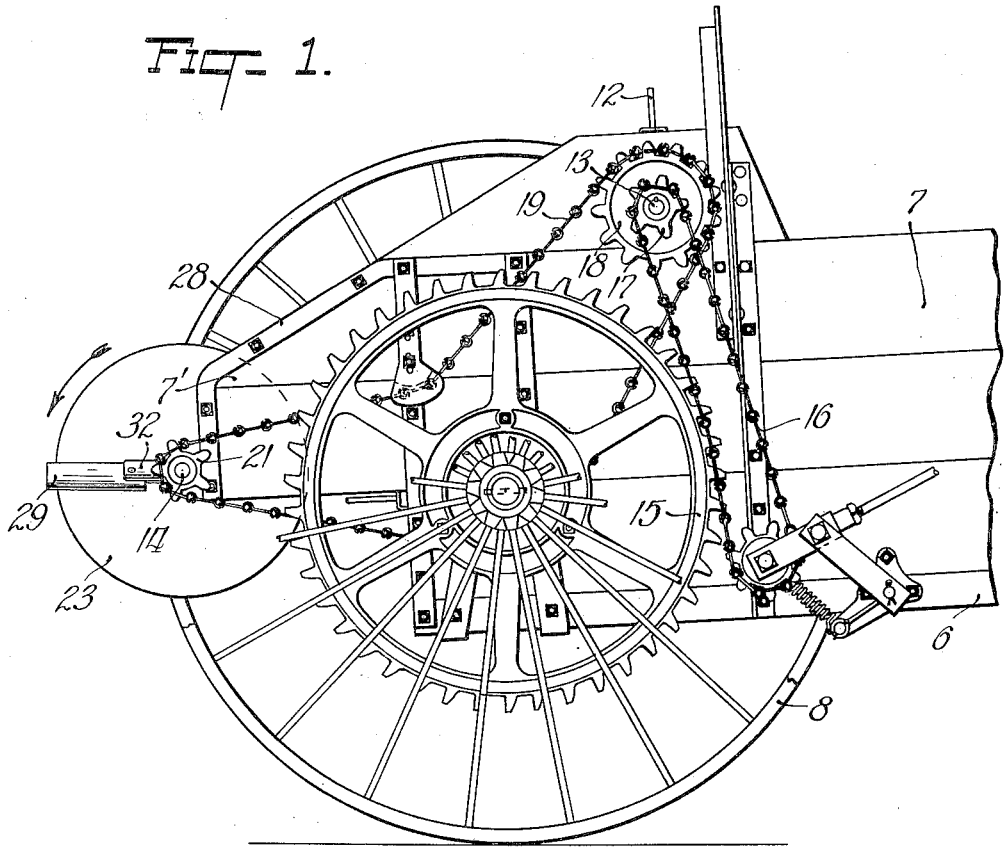

The conventional manure spreader comprises a load carrying bed 6 having side walls 7, the rear end of the bed being supported between two traction wheels 8 which supply the necessary power for operating the feeding apron, the beater cylinders and the widespreading device. The feeding apron referred to, which is old and well known, serves to move the load gradually toward the rear end of the bed to continuously present the pile of manure to the action of the one or more beating cylinders. Such beating cylinders are usually in the form of rotating toothed frames which break up or disintegrate the mass of manure and throw the same rearwardly to the wide spreading device. In the construction shown there are two of these beating cylinders, one cylinder 11 being mounted on the axle of the traction wheels 8 and the other cylinder 12 being mounted upwardly and forwardly of the cylinder 11 on a beater shaft 13 extending between the side walls 7 of the bed. It will be understood that this arrangement of beating cylinders is merely exemplary and that the invention has nothing to do with such construction. The widespreading device is usually mounted on a transverse shaft 14 disposed at a point in rear of the beater mechanism so as to receive the manure projected rearwardly from said mechanism. One manner of driving the beater cylinders and the widespreading device is to provide a large sprocket wheel 15 on one of the traction wheels 8 and have this sprocket wheel drive a chain 16 which passes over a sprocket pinion 17 on the upper beater shaft 13.

A larger sprocket gear 18 on this same shaft drives the chain 19 which passes around a sprocket pinion 21 on the widespreader shaft 14 and which also passes under a sprocket wheel operatively connected to the lower beater cylinder.

Figure 2:
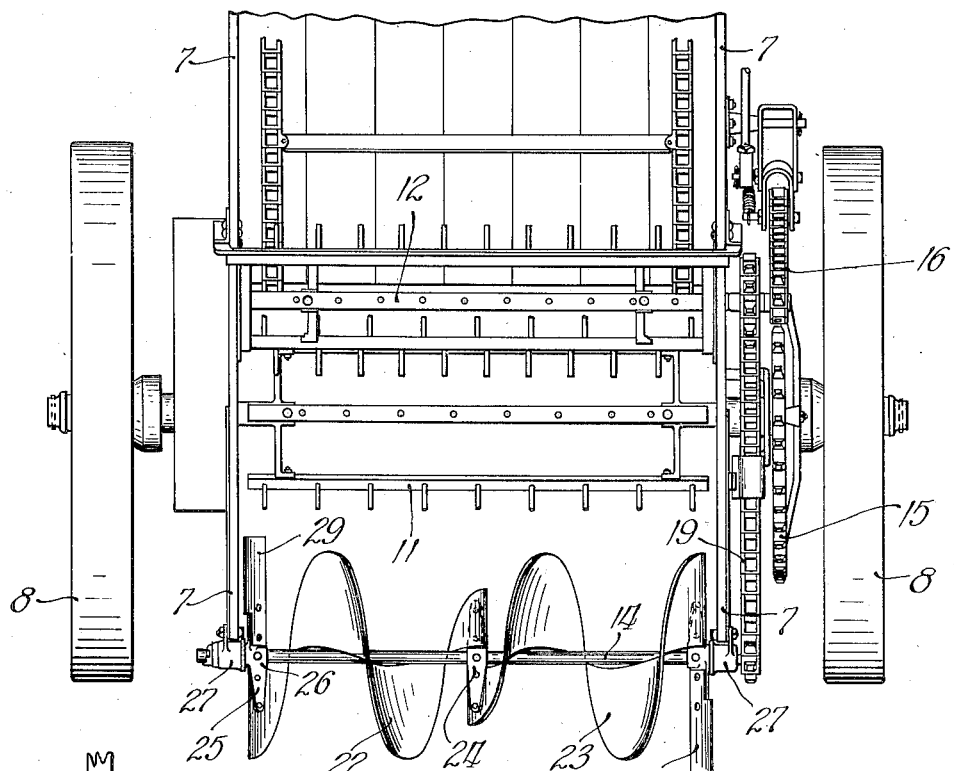
Fig. 2 is a plan view of the same.
Figure 3:
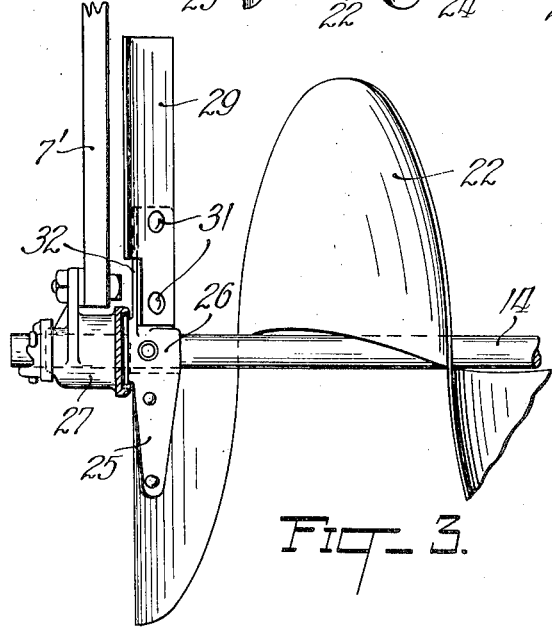
Fig. 3 is a detailed view illustrating the manner of mounting the scraper blades on the widespreading device.

Referring to Figs. 2 and 3, the widespreading device comprises two helically twisted blades 22 and 23 mounted on the spreader shaft 14 and having opposite directions of pitch or lead so that the left hand blade 22 will tend to project the manure to the left and the right hand blade 23 will tend to project the manure to the right, as the spreading device is rotated in the rearward or counter-clockwise direction as viewed in Fig. 1. The inner ends of the two spreading blades may be secured to the shaft 14 through a clamp having radially extending arms 24 to which the ends of the blades are secured. The outer ends of the two spreading blades are secured to arms 25 extending from hub members 26 which are fixedly secured to the shaft 14. The projecting ends of said shaft have bearing support in bearing brackets 27 which are secured to the rearward extensions 7' of the supporting structure between which the widespreading device is mounted. In the construction illustrated the supporting portions 7' consist of rearwardly extending ends of the side boards 7, marginally braced by suitable angle bars 28. When the supporting structure 7' is constructed solid in this manner, it serves the additional purpose of preventing the laterally projected manure from being thrown against the traction wheels 8 and accumulating thereon.

The invention is of equal utility, however, when the supporting structure 7' consists of open-work frames projecting rearwardly to support the shaft 14.

A considerable part of the manure projected laterally from the ends of the widespreading device necessarily impinges against the inner sides of the supporting portions 7' irrespective of the form of these portions. As previously stated, when this manure is wet it tends to adhere to the supporting members 7' and upon drying becomes a relatively hard mass. As these accumulations increase, they soon project into the path of rotation of the spreading blades 22 and 23, restricting the rotation thereof and causing the same to vibrate objectionably, and also imposing an increased tractive load on the vehicle. Because of the outwardly deflecting pitch of the two spreading blades, the ends thereof have a tendency to compact these accumulations more firmly against the inner sides of the supporting members 7'.

The means which are employed for preventing these accumulations of manure on the inner sides of the supporting means 7' comprise blade arms 29 disposed at the ends of the widespread device 22—23. These blades are secured by rivets or bolts 31 to arms 32 which extend substantially radially from the mounting hubs 26. Each blade arm 29 has a pitch which is the reverse of that of the adjacent distributing blade 22 and 23, so that the leading edge of the blade arm is presented as a shearing edge for cutting off accumulations of manure on the inner sides of the supporting means 7'.

Referring to Fig. 3, it will be seen that this shearing edge of each blade arm projects closer to the supporting means 7' than does the end edge of the adjacent widespread blade. Hence the accumulations are sheared off to a point where the ends of the distributing blades can revolve without friction or obstruction. The reverse pitch of the blade arms 29 tends to throw the manure inwardly in opposition to the lateral distribution of the widespread device, and to minimize the quantity of manure thus thrown inwardly the two blade arms are made comparatively narrow so that in effect they merely shear off the accumulations and drop the same downwardly. The blade arms may be set at any desired angle with respect to the outer edge of the adjacent distributing blade, but preferably the arms extend diametrically opposite to the end of the distributing blade. The arrangement is also preferably such that the two blade arms extend outwardly from opposite sides of the shaft 14, substantially 180 degrees apart, so that they successively engage their respective accumulations on the supporting means 7' and hence have their shearing operations occurring at spaced intervals in each rotation of the shaft 14. Obviously, two or even more blade arms may be employed at each end of the widespread device, but I find the operation of one blade arm to be entirely satisfactory.

Having thus described my invention what I claim as new and desire to secure by Letters Patent is:

1. The combination with a manure spreader comprising a widespreading device and supporting means therefor, of shearing means for preventing accumulations of manure on said supporting means such as tend to restrict operation of said widespreading device.

2. The combination with a manure spreader comprising a rotary widespreading device and supporting means therefor, of rotary means for preventing accumulations of manure on said supporting means such as tend to restrict rotation of said widespreading device.

3. The combination with a manure spreader comprising a rotary widespreading device and supporting means therefor, of means mounted on said widespreading device acting to prevent accumulations of manure on said supporting means.

4. The combination with a manure spreader comprising a widespreading device and supporting means therefor, of shearing means at the ends of said widespreading device for cutting off accumulations of manure from the inner sides of said supporting means.

5. The combination with a manure spreader comprising a helical widespreading device and supporting means therefor at the ends thereof, of blades mounted at the ends of said widespreading device for shearing off accumulations of manure from the inner sides of said supporting means.

6. The combination with a manure spreader comprising helical widespreading blades rotatably mounted on supporting means at the outer ends of said blades, of blade arms disposed at the outer ends of said widespreading blades for shearing off accumulations of manure from the inner sides of said supporting means.

7. In a manure spreader, the combination with a widespreading device comprising a transverse shaft, two helical distributing blades mounted on said shaft and having opposite directions of pitch for projecting the manure laterally in opposite directions, supporting structure extending rearwardly from the bed of the manure spreader at each side thereof for supporting each end of said transverse shaft, of blade arms extending from said shaft at the outer ends of each of said distributing blades, the pitch of said blade arms being reversed with respect to the adjacent distributing blade so that said blade arms shear off accumulations of manure from the inner sides of the adjacent supporting structure in which said shaft is mounted, said blade arms projecting from said shaft in angularly spaced relation.

8. In a manure spreader, the combination with a widespreading device comprising a transverse shaft and distributing blades mounted thereon, hubs secured to said shaft, arms extending from said hubs, the outer ends of said distributing blades being secured to said arms, supporting means on the manure spreader in which the ends of said shaft have rotatable support, means for driving said shaft, secondary arms projecting from said hubs, and shearing blades mounted on said secondary arms and operating to remove accumulations of manure from the inner sides of said supporting means.

9. The combination with a fertilizer spreader, of a wide spreading device thereon, supporting means for mounting said widespreading device, and means for cutting off accumulations of fertilizer tending to adhere to said supporting means.

10. The combination with a manure spreader comprising a widespreading device and supporting means therefor, of blades mounted at the ends of said wide spreading device for shearing off accumulations of manure from the inner sides of said supporting means, said blades being adapted to rotate in planes parallel with the planes of the supporting means.

In witness whereof, I hereunto subscribe my name this 8th day of June, 1928.

CARL H. GAMBLE.